United States Patent Office 3,129,193
Patented Apr. 14, 1964

3,129,193
COMPOSITIONS COMPRISING A VINYL HALIDE POLYMER AND THE REACTION PRODUCT OF CASTOR OIL WITH A HALIDE OF A SULFUR GROUP ELEMENT
Rudolf Kern, Neustadt an der Weinstrasse, and Rudolf Punessen, Rohrhof Uber Schwetzinge, Germany, assignors to Rhein-Chemie, G.m.b.H., Mannheim-Rheinau, Germany
No Drawing. Filed Aug. 13, 1959, Ser. No. 833,396
12 Claims. (Cl. 260—23)

The present invention relates to polyvinyl halide compositions, including polyvinyl chloride and copolymers of vinyl chloride with vinyl and/or vinylidene compounds copolymerizable therewith. It particularly relates to compounds having a base of such polymers and comprising a non-bleeding non-migratory and non-tacking component which gives improved physical properties, surface characteristics, dry feel or hand to mixtures of plasticized polyvinyl chloride. This component also prevents or diminishes the blocking effect and improves the compatibility of ester plasticizers which tend to bleed or migrate with polyvinyl halides. The present invention also relates to methods for making said compounds and plasticized vinyl compositions.

At the present time, polyvinyl chloride is a widely used material. However, some articles made from it have a great drawback. For example, even at lower temperatures they offer but little resistance to deformation by tension or compression. Thus, for example, floor coverings or tiles that support heavy pieces of furniture acquire sharply marked indentations which remain even after the load is removed.

It is known that polyvinyl chloride compounds containing reaction products of ethylene hydrocarbons, dienes and the like containing ester or ether groups with sulphur chlorides, are characterized by good resilience.

Esters, particularly diesters made from glycols and whose carbon chains are interrupted by at least two bonded-together sulphur atoms, together with monobasic carbonic acids, have been used as solvents, gelatinizing agents, distending agents and softeners in polyvinyl chloride resins. The film-forming substances obtained in this way are characterized by good resistance to low temperatures.

Moreover, the esters of beta-alkyl mercapto propionic acids, with polyalcohols containing sulphur have been employed as solvents, softeners and gelatinizing agents for plastic masses. The products obtained in this way have good electrical insulating properties. However, all speciments made of these prior art compositions have exhibited poor compression strength when under load and a high permanent set.

Moreover, when polyvinyl chloride or polyvinyl chloride base polymers are milled or masticated with plasticizer, oftentimes it is very difficult to get a uniform mix. When the molecular weight of the polymer is high, the difficultly is increased. Films or streaks of less plasticized or more highly plasticized polymers may be formed which can only be removed by excessive mastication which is known and recognized to cause serious depolymerization of the polymer and a decrease in physical properties of the original composition.

It is an object of the present invention to provide plasticized polyvinyl halide compositions which have improved surface characteristics, an especially dry feel indicating an absence of bleeding of plasticizer, good compression strength (or resistance to loss of thickness) and low permanent set (ability to return to original height).

Another object of the present invention is to provide a plasticized polyvinyl halide composition of higher molecular weight polymers and which is homogeneous and without streaks of more or less plasticized material therein.

A further object is to provide a method for making a plasticized polyvinyl halide composition exhibiting the foregoing useful properties.

These and other objects and advantages of the present invention will become more apparent to those skilled in the art from the following detailed description and examples.

In accordance with the present invention, it has been found that products made by reacting sulfur chloride with castor oil will greatly improve polyvinyl halide compositions. The phenomenon of "cold flow" is decreased when all or a part of the plasticizer usually employed in the processing of a polyvinyl halide such as polyvinyl chloride is replaced by conversion or reaction products made from castor oil and a halide of a sulfur group element such as sulphur chloride. Molded articles of polyvinyl chloride made in this way display a substantially reduced deformability, and a better recovery after removal of the load. The original figures are reached or almost reached. The conversion products made from castor oil with sulphur chloride, and added in accordance with the invention, do not sweat out of or bleed or migrate from the polyvinyl chloride mixtures. They in their turn even prevent a sweating out of the usual ester plasticizers of the dioctlyphthalate type. The other characteristics required of polyvinyl chloride products are moreover retained, or are even improved. The products produced in accordance with the invention are homogeneous, smooth, and have a dry or essentially dry surface. Polyvinyl halide compositions containing the above reaction products provide compositions which have superior tensile strength, a particularly desirable appearance, good uniformity and a dull looking surface when calendered, which makes sheets and films thereof of exceptional value. Said reaction products also provide a substantial increase in strength of the compositions. They display great resistance to swelling in organic solvents, and to mechanical stresses.

The advantages described above exist even when fillers are used at the same time e.g. light colored fillers such as silicic acid, alumina gel, precipitated alumina silicate, precipitated calcium silicate, titanium dioxide, chalk, clay, blanc fixe.

The polyvinyl halide material which may be use in combination with the substances according to the present invention may be any polyvinyl fluoride, chloride or bromide or mixture thereof of any molecular weight, mixtures of polyvinyl halides with polyvinyl acetate, copolymers of vinyl halide with vinyl acetate and or vinylidene chloride or halide and other copolymers of vinyl halides with other copolymerizable monomers, such as butyl acrylate, and other acrylic esters and nitriles, etc. Block or graft polymers formed by mastication of a polyvinyl halide in nitrogen, etc., preferably while at a temperature to provide a rubbery state in the presence of monomeric materials such as a styrene, butyl acrylate, methyl methacrylate, acrylonitrile, etc. may also be used.

The vinyl halide homopolymers, or copolymers, graft polymers or mixtures contain at least 50% by weight and preferably at least 75% by weight of the vinyl halide. Of the vinyl halides, it is preferred to use vinyl chloride.

The novel products according to the invention are most conveniently produced by simply contacting the castor oil with sulfur chloride and the like. The oils may be dissolved in saturated solvents, such as pentane, during the reaction and the solvent and any hydrochloric acid present can be removed by evaporation.

The oils may also be dissolved in non volatile distending agents e. g. mineral oils and plasticizers for polyvinyl halide compositions. The resulting reaction products can be used after neutralisation without separation from the solvent.

In the reaction products of castor oil with sulfur chloride and the like, combined sulfur and the like plus halogen in amounts as low as about 5% by weight provide considerable improvement in the plasticized resin composition. However, better results are obtained when the amount of sulfur plus halogen and the like present is increased to above about 10%, and optimum improvement is usually obtained when the sulfur plus halogen in the plasticizer product is about 20 to 30% by weight or sufficient to completely saturate the product. After reaction, the product may be neutralized with alkaline materials and mixed with conventional vinyl resin stabilizers.

The sulfur chloride used is sulfur monochloride ($S_2Cl_2$), sulfur dichloride ($SCl_2$), and sulfur tetrachloride ($SCl_4$) or mixtures of two or more of these materials. In place of chlorine, the fluorine or bromine derivatives of sulfur can be used such as sulfur monobromide, sulfur monofluoride and the like. Likewise, the corresponding selenium and tellurium halides are also usefully employed such as selenium monobromide, selenium tetrachloride, selenium tetrafluoride, tellurium dibromide, tellurium tetrachloride and the like. Mixtures of these halides of the sulfur group elements can be used.

The castor oil employed may be refined, unrefined, bleached and the like. However, it is preferred to use the refined or purified oil.

The above described reaction product of castor oil is mixed with the polyvinyl halide as a dispersion in latex form and the mixed dispersion coagulated and later masticated, or said reaction product may be incorporated by mastication on a mill directly into the polyvinyl halide base composition. Also the substances according to the present invention can be mixed with powdered polyvinyl halide before the powdered product is coalesced by mastication. Any desirable method of mixing may be utilized. They can be fluxed or fused on the mill or molded as desired.

The weight of the conversion product of castor oil generally used is sufficient to give good compression strength, low permanent set, to improve the compatibility of the ester plasticizer and to diminish the blocking effect of the polyvinyl halide base composition. As little as 2 or 3 parts by weight of the reaction product of castor oil per 100 parts by weight of vinyl polymer, when mixed with the polyvinyl halide composition has a noticeable beneficial effect. The beneficial effect and properties for most applications become greater as the amount of said reaction product is increased. The optimum amount of the conversion product of castor oil depends on the rigidity desired in the finished material and also on the molecular weight of the polymer, being higher for higher molecular weight polymers.

For most applications at least 10 parts by weight of one or more of the reaction products of castor oil according to the invention based on 100 parts by weight of the polyvinyl halide compositions are usually used and higher percentages, such as up to 60 parts may be present.

Plasticizers such as esters, especially polyesters prepared by reacting butanol, octanol, ethylene glycol and/or mixtures of ethylene and propylene glycols with dicarboxylic acids such for example as adipic acid, phthalic acid, isophthalic acid or sebacic acid, etc., and other saturated polymeric plasticizers, such as those prepared by reacting mixtures of glycols, such as ethylene and propylene glycols, with one or more saturated or even unsaturated acids, are also useful in conjunction with the halogenated sulfurized castor oil.

When the conversion product of castor oil is used in combination with a plasticizer, such as dioctyl phthalate, di-butyl phthalate, dioctyl adipate, tricresyl phosphate, or other ester, the total amount of plasticizer and of said reaction products of castor oil present is generally less than the weight of the polyvinyl halide base composition and at least about 10 parts by weight based on 100 parts of the vinyl polymer, and up to 100 parts total content of plasticizer and of said reaction product. Generally, 25 to 50 or 75 parts by weight, based on 100 parts by weight of polymer present, of total plasticizer and reaction product of castor oil present provide optimum properties for most applications.

Finely divided fillers or pigments, such as $TiO_2$, $SiO_2$-containing materials e.g. silica gel, $SiO_2$, silicates, such as precipitated alumina or calcium silicates, alumina gel, chalk, color pigments, rubber, resins, synthetic or natural fibers, phthalocyanines, stabilizers, fungicides, antioxidants, etc. may also be present in the composition as is customary in polyvinyl halide base compositions. For example, up to 25% by weight of $SiO_2$ containing material may be added to the polymeric composition.

Examples of some useful stabilizers for the vinyl resin and the reaction products of castor oil are basic lead carbonate, and di and tri sodium phosphates, etc., the barium, cadium, calcium tin and zinc salts of stearic, lauric, capric and phthalic acids and the like; the di-alkyl tin carboxylates, mercaptides, sulfonamides and alcoholates; and the epoxides, organic phosphites, alkylated phenols, urea and the like and mixtures thereof.

The tensile strength of compositions prepared with the reaction products according to the present invention may be as much as 50% or more over that of compositions prepared in a similar manner with other plasticizers such as the monomeric ester plasticizers.

Said conversion products of castor oil greatly decrease the wetting-out or bleeding of the ester plasticizers so that exceptionally desirable combinations may be made.

The compositions of the present invention are extrudable with relative ease compared to other polyvinyl chloride base compositions and retain their extruded shapes in a surprising maner. The recovery of articles made from the polyvinyl chloride compositions, for example floor tile or floor coverings, after pressure stress as may be applied through furniture in contact with the floor coverings, is relatively powerful and fast after removal of the load causing deformation. In addition to making floor tiles, these compositions are useful as wall tiles or coverings, in chair coverings, shoe soles, cable jacketing or sheathing, conveyor belting, book covering, purse making, for producing aprons or the like and are used advantageously when a dry non tacking surface is desirable.

The following examples, in which parts are by weight, will serve to illustrate the present invention with more particularity to those skilled in the art.

The stabilizer used in the following examples was "Advastab 17M," a commercial product of the Advance Product Company. It consists of an organo-tin compound, containing a sulfur bridge.

The expression "K value" in the following examples is a measure for the degree of polymerisation of high molecular materials (see H. Fikentscher, Cellulosechemie 13, page 60, 1932).

*Example I*

100 g. of polyvinyl chloride (K value=50) are gelatinzed while using 1 g. of stabilizer, separately with:

(A) 50 g. dioctylphthalate;
(B) A mixture of 37.5 g. of dioctylphthalate and 12.5 g. of the neutral and stabilized product made from castor oil and 20% sulphur chloride;
(C) A mixture of 37.5 g. of dioctylphthalate and 12.5 g. of the neutral and stabilized conversion or reaction product made from rape-seed oil and 20% sulphur chloride.

After calendering, specimens 10 mm. in diameter and 10 mm. in height are made from the mixtures. The specimens are loaded in the usual way with 20 kg. at room temperature, whereby the surface pressure amounts to 25.4 kg. per sq. cm. After 60 minutes during which the load acts continuously, the specimens showed the following compressions:

(A) 33.5% loss of thickness,
(B) 4.9% loss of thickness, and
(C) 35.6% loss of thickness After this, the specimens were relieved of load; and after 60 minutes, the remaining deformation (permanent set) was measured. This amounted to:

(A) 7.8%,
(B) 0.4%, and
(C) 21.3%.

*Example II*

The method of this Example was generally the same as that of Example I, above, except as changed below. 100 g. of polyvinyl chloride (K value=80) and 1 g. of stabilizer are mill mixed with:

(A) 50 g. dioctyladipate; and
(B) 40 g. dioctyladipate and 10 g. of the neutral and stabilized reaction product made from castor oil and 20% sulphur chloride.

The loss of thickness and residual deformation (permanent set) were determined in accordance with Example I above, for specimens made after calendering:

|   | Percent thickness loss | Percent deformation remaining |
|---|---|---|
| (A) | 35.4 | 9.3 |
| (B) | 5.3 | 0.6 |

*Example III*

Mixtures were prepared according to the method of Examples IIA and IIB, above except that each contained in addition 25 parts of finely dispersed pyrogenic silicic acid (Aerosil=registered trademark of "Deutsche Gold- und Silberscheideanstalt).

The results obtained are shown below:

|   | Percent thickness loss | Percent deformation remaining |
|---|---|---|
| (A) | 34.8 | 10.2 |
| (B) | 4.8 | 0.5 |

*Example IV*

100 g. of polyvinyl chloride (K value=50) and 1 g. of stabilizer were mill mixed with varying amounts of dioctylphthalate and the neutral and stabilized conversion product made from castor oil and 20% sulphur chloride respectively with the reaction product of castor oil as follows:

(A) An addition of 50 g. dioctylphthalate,
(B) An addition of a mixture of 25 g. dioctylphthalate and 25 g. of the neutralized and stabilized conversion product made from castor oil and 20% sulphur chloride, and
(C) An addition of 50 g. of the neutralized and stabilized conversion product made from castor oil with 20% sulphur chloride.

Thickness loss and residual deformation were determined in accordance with Example I on molded objects made with these compositions. Results obtained are shown below.

|   | Percent thickness loss | Percent deformation remaining |
|---|---|---|
| (A) | 33.5 | 7.5 |
| (B) | 3.35 | 0.38 |
| (C) | 2.24 | 0.2 |

*Example V*

The method of this example was the same as that of Example IV, above, except that 25 parts of finely dispersed (finely divided) silicic acid (prepared by precipitation from aqueous solutions) were added to each composition (IV–A, –B and –C).

The results obtained on test are shown below:

|   | Percent thickness loss | Percent deformation remaining |
|---|---|---|
| (A) | 31.3 | 10.0 |
| (B) | 3.0 | 0.3 |
| (C) | 1.97 | 0.12 |

*Example VI*

100 g. polyvinyl chloride (K value=50) and 1 g. stabilizer were mill mixed separately with:

(A) 50 g. dioctylphthalate,
(B) 50 g. dioctylphthalate and 25 g. Omya chalk BSH (surface-coated calcium carbonate), and
(C) A mixture of 40 g. dioctylphthalate and 10 g. of the neutral and stabilized conversion product from castor oil and sulphur chloride and 25 g. Omya chalk BSH. (Omya chalk BSH is a registered trademark of Omya-Mahlwerke and is a Champagner chalk surface-treated with stearic acid.)

The thickness loss and residual deformation were determined in accordance with Example I above for specimens made after calendering and the results obtained are shown below:

|   | Percent thickness loss | Percent deformation remaining |
|---|---|---|
| (A) | 33.5 | 7.8 |
| (B) | 31.9 | 9.1 |
| (C) | 5.3 | 0.8 |

*Example VII*

100 g. polyvinyl chloride (K value=50) and 1 g. stabilizer were mill mixed separately with:

(A) 50 g. dioctylphthalate
(B) A mixture of—
   47 g. dioctylphthalate and
   3 g. of the neutralized and stabilized conversion product made from castor oil and 20% of sulphur chloride.
(C) A mixture of—
   44 g. dioctylphthalate and
   6 g. of the neutralized and stabilized conversion product made from castor oil and 20% sulphur chloride.

The loss of thickness and the residual deformation were determined in accordance with Example I above, for specimens made after calendering.

|   | Percent thickness loss | Percent deformation remaining |
|---|---|---|
| (A) | 33.5 | 7.8 |
| (B) | 29.6 | 2.24 |
| (C) | 27.3 | 1.81 |

Example VIII 100 g. of a copolymer consisting of 92% vinyl chloride and 8% vinyl acetate (K value=60) and 1 g. of stabilizer were mill mixed with:
(A) 30 g. dioctylphthalate
(B) A mixture of—
   10 g. dioctylphthalate and
   20 g. of a conversion product made from castor oil and 10% sulphur chloride.

Thickness loss and residual deformation were determined according to Example I on molded objects.

|     | Percent thickness loss | Percent deformation remaining |
| --- | --- | --- |
| (A) | 34.8 | 8.4 |
| (B) | 4.25 | 0.41 |

Example IX

Mixtures were prepared according to the method of Example VIII A and VIII B above, except that each contained in addition 10 g. of finely divided alumina gel.

The results obtained are shown below:

|     | Percent thickness loss | Percent deformation remaining |
| --- | --- | --- |
| (A) | 34.1 | 8.8 |
| (B) | 3.91 | 0.46 |

Example X 100 g. of a copolymer consisting of 85% vinyl chloride and 15% vinylidene chloride and 1 g. of stabilizer were mixed with:
(A) 75 g. dioctylphthalate
(B) A mixture of—
   45 g. dioctylphthalate and
   30 g. of a conversion product made from castor oil with 20% sulphur chloride.

Thickness loss and residual deformation were determined according to Example I.

|     | Percent thickness loss | Percent deformation remaining |
| --- | --- | --- |
| (A) | 38.3 | 8.7 |
| (B) | 5.4 | 0.42 |

It also is apparent that in accordance with the provisions of the patent statutes modifications of the invention may be made without changing the spirit thereof.

What is claimed is:

1. A composition comprising a polymeric material of a vinyl halide and intimately dispersed therewith in an amount sufficient to improve the compression strength, the recovery after removal of the load and the surface characteristics of said polymeric material, at least one reaction product of castor oil with a halide of a sulfur group element in which such halide is selected from the class consisting of fluorine, chlorine and bromine and said element is selected from the class consisting of sulfur, selenium and tellurium.

2. A composition according to claim 1 in which said material is polyvinyl chloride and said reaction product is the product obtained by the reaction of castor oil with sulfur chloride and containing from about 5 to 30% by weight combined sulfur and chlorine.

3. A composition according to claim 2 containing additionally a light colored filler in an amount up to about 25% by weight of the composition.

4. A composition according to claim 2 in which the relative amounts of polymeric material to said reaction product are about 100 parts by weight of said polymeric material to from about 2 to 60 parts by weight of said reaction product.

5. A composition according to claim 2 in which the relative amounts of polymeric material to said reaction product are about 100 parts by weight of said polymeric material to from about 10 to 50 parts by weight of said reaction product.

6. A composition comprising a polymeric material selected from the group consisting of a vinyl halide polymer and a copolymer having at least 50% by weight of vinyl halide and the balance essentially a monomer selected from the group consisting of a vinylidene halide and vinyl acetate, an ester plasticizer and the reaction product of castor oil with a halide of a sulfur group element in which said halide is selected from the class consisting of fluorine, chlorine and bromine and said element is selected from the class consisting of sulfur, selenium and tellurium, in amounts sufficient to provide from about 5% by weight up to saturation of combined halogen and sulfur group element, the total amount of said ester plasticizer and said reaction product being from about 10 to 100 parts by weight per 100 parts by weight of said polymeric material.

7. A composition according to claim 6 in which said polymeric material is polyvinyl chloride, and said reaction product is the product obtained by the reaction of castor oil with sulfur chloride and containing from about 5 to 30% by weight total sulfur and chlorine.

8. A composition according to claim 7 containing additionally a light colored filler in an amount up to about 25% by weight of the composition.

9. A composition according to claim 7 in which the relative amounts of said polymeric material to said ester plasticizer and said reaction product are about 100 parts by weight of said polymeric material to from about 25 to 75 parts by weight total of said ester plasticizer and said reaction product.

10. A composition acocrding to claim 7 in which the relative amounts of said polymeric material to said ester plasticizer and said reaction product are about 100 parts by weight of said polymeric material to from about 25 to 50 parts by weight total of said ester plasticizer and said reaction product.

11. The method which comprises mixing together a polymeric material selected from the group consisting of a vinyl halide polymer and copolymer of a vinyl halide and the reaction product of castor oil and a halide of a sulfur group element in which said halide is selected from the class consisting of fluorine, chlorine, and bromine and in which said element is selected from the class consisting of sulfur, selenium and tellurium, the relative amounts of said polymeric material and reaction product being about 100 parts by weight of said polymeric material to from about 2 to 60 parts by weight of said reaction product.

12. The method according to claim 11 in which the relative amounts of said polymeric material and said reaction product are about 100 parts by weight of said polymeric material to from about 10 to 50 parts by weight of said reaction product.

References Cited in the file of this patent

UNITED STATES PATENTS

| 2,402,910 | Novak et al. | June 25, 1946 |
| --- | --- | --- |
| 2,427,717 | Dearborn | Sept. 23, 1947 |
| 2,644,825 | Beretvas | July 7, 1953 |
| 2,686,764 | Geister et al. | Aug. 17, 1954 |

FOREIGN PATENTS

| 12,795 | Great Britain | Sept. 4, 1888 |
| --- | --- | --- |

OTHER REFERENCES

Chemical Technology and Analysis of Oils, Fats, and Waxes, by J. Lewkowitsch, Macmillan Co., Ltd., London, volume I, 6th edition, 1921, pages 474, 475, 476, 499 and 500.